United States Patent [19]

Miller, deceased et al.

[11] 4,282,794

[45] Aug. 11, 1981

[54] SELF-PROPELLED OFF-ROAD VEHICLE

[76] Inventors: Avy L. Miller, deceased, late of Encino, Calif.; by Roberta L. Miller, deceased, late of Encino, Calif.; Lindsey Miller-Lerman, 715 J. E. George Blvd., Omaha, Nebr., executor

[21] Appl. No.: 34,430

[22] Filed: Apr. 30, 1979

[51] Int. Cl.³ ............................................. F41H 7/02
[52] U.S. Cl. .................... 89/36 M; 89/1.815; 89/38; 182/63; 182/69; 182/148
[58] Field of Search .................. 89/36 M, 37.5 D, 38; 182/63, 69, 141, 148

[56] References Cited

U.S. PATENT DOCUMENTS

| | | | |
|---|---|---|---|
| 3,516,514 | 6/1970 | Malloy et al. | 182/148 |
| 4,070,807 | 1/1978 | Smith | 182/63 |

FOREIGN PATENT DOCUMENTS

| | | | |
|---|---|---|---|
| 932297 | 8/1955 | Fed. Rep. of Germany | 89/36 M |
| 6312 | of 1914 | United Kingdom | 89/36 M |

*Primary Examiner*—Stephen C. Bentley
*Attorney, Agent, or Firm*—Fulwider, Patton, Rieber, Lee & Utecht

[57] ABSTRACT

A self-propelled off-road vehicle particularly adapted for military use against targets such as tanks. The vehicle chassis mounts an elevatable support platform to which an operator platform is pivoted. The operator platform carries one or more weapons pods and a sighting device such as a periscope, both of which can be elevated above the operator platform. The operator platform is rotatable relative to the support platform to sweep the sighting axis of each weapons pod through azimuth, and its pivotable relation to the support platform allows the sighting axis to be swept through elevation for alignment with the target. Other aspects of the invention include propulsion, transmission, and wheel suspension systems enabling the vehicle to negotiate difficult terrain, maneuver at relatively high speeds, and utilize rocks, trees, and low folds in the ground to avoid exposure to ground-level sightings by tanks or the like.

17 Claims, 17 Drawing Figures

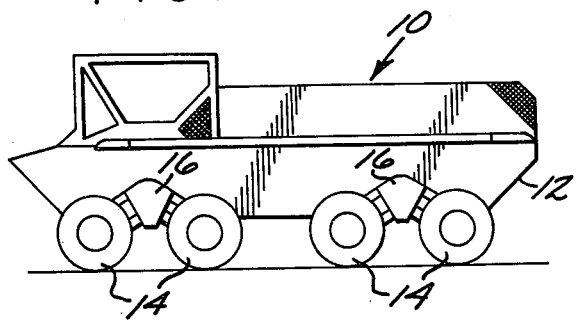
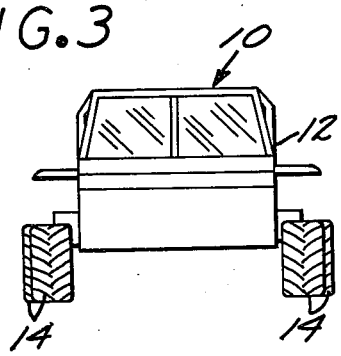
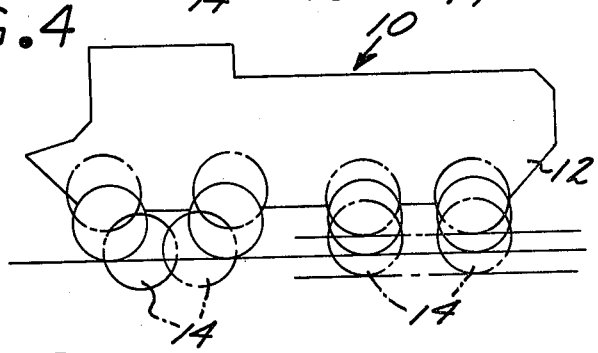
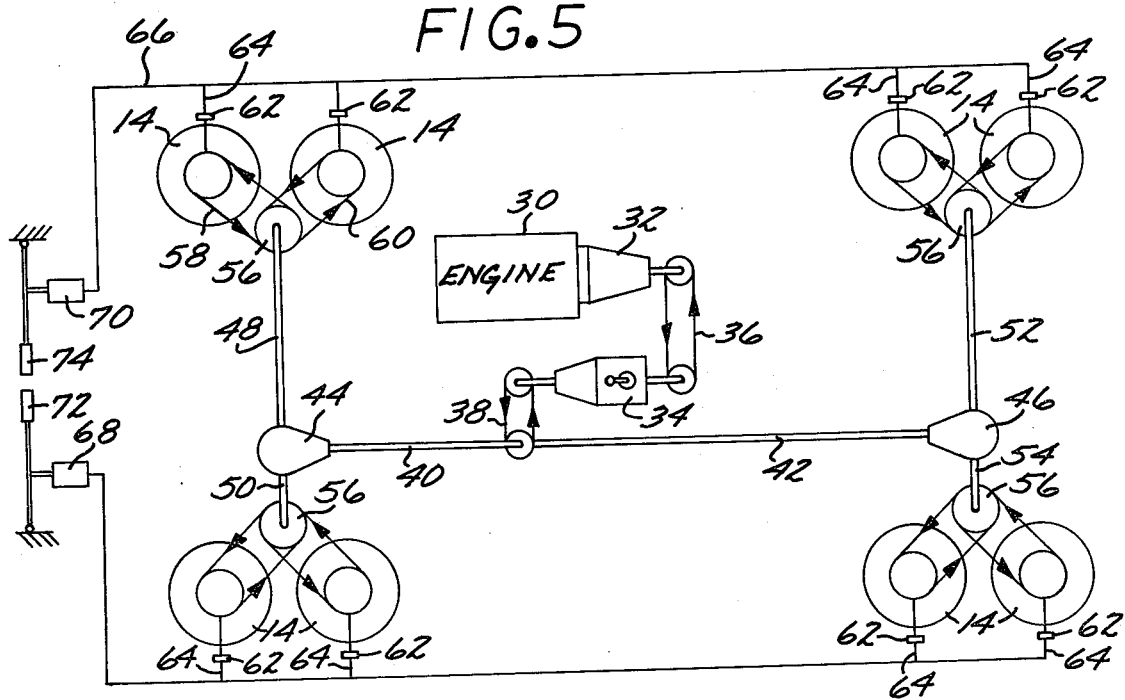
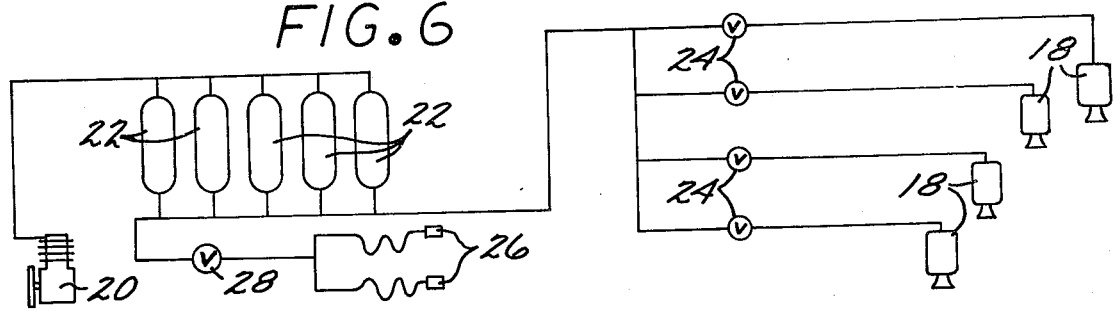

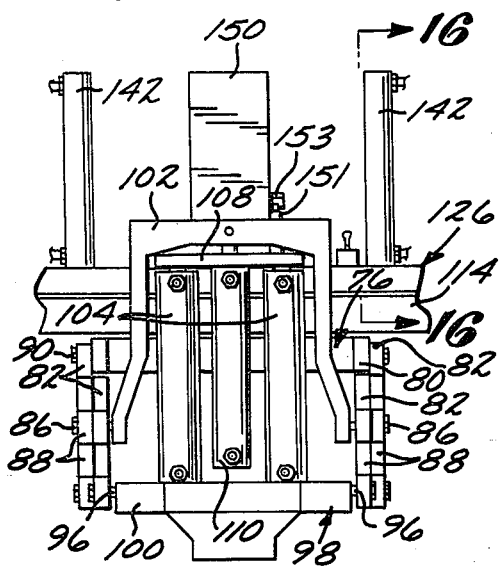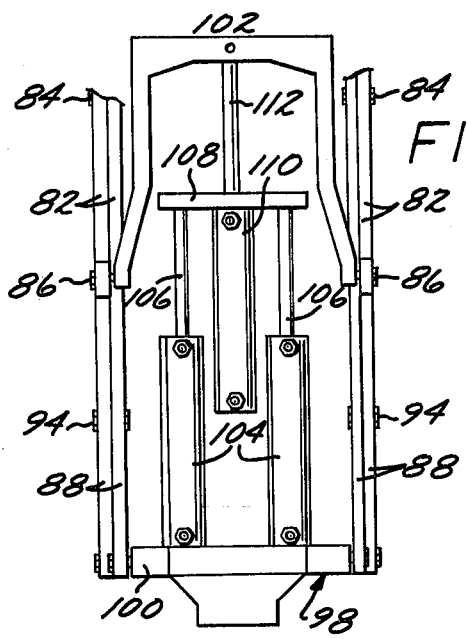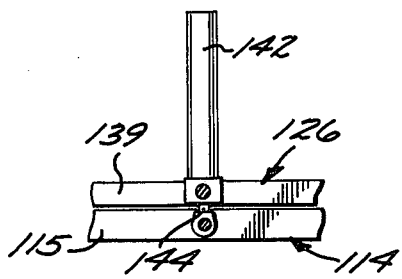

SELF-PROPELLED OFF-ROAD VEHICLE

BACKGROUND OF THE INVENTION

1. Field of the Invention:

The present invention relates to self-propelled off-road vehicles and more particularly to military vehicles for attacking targets such as tanks.

2. Description of the Prior Art:

Military tanks have evolved into heavily armed and armored vehicles supported, driven, and steered by endless crawler or caterpillar tracks which move over bogey wheels to enable negotiation of rough and steep terrain. The effectiveness of resistance to a surprise attack by this type of vehicle depends upon the availability of aircraft, resisting tank forces or artillery, failing which infantrymen must take up the task armed with rocket launchers or the like. Even assuming that such infantrymen are available at the site of the battle, men do not have the mobility and speed of movement necessary to constitute a serious threat to modern tanks.

Certain prior art military vehicles have been designed for intercepting and destroying tanks, but such vehicles are either extremely expensive or are incapable of rapid deployment and concealment while preparing to launch their weapons.

SUMMARY OF THE INVENTION

According to the present invention, a self-propelled off-road vehicle is provided which is adapted to negotiate all types of terrain and which is particularly suited for anti-tank warfare. It is relatively small in size, preferably seating two men. It is highly maneuverable, capable of travel at relatively high speeds, and its propulsion and transmission systems are able to provide a wide range of forward and rearward speeds. The wheel suspension is preferably of the walking beam type for negotiating steep and irregular terrain.

The vehicle includes means for elevating a missile and operator platform above the vehicle chassis for locating and firing upon a target from the concealment of rocks, trees, low hills and the like.

In particular, the vehicle comprises a chassis which mounts a support platform to which is pivotally attached another platform for supporting the operator. Once the vehicle has reached a point of concealment near the target area, the suspension system is operable to achieve a leveling effect should the terrain be sloping or rough. The operator platform is elevated to raise the prone operator to a point just below the crest or ridge, for example, of the concealing terrain. Weapons pods and a sighting device such as a periscope are pivotable upwardly of the operator platform so that the firing axes of the missile pods and the sighting axis of the periscope bear a predetermined relation to each other, such that sighting of the target through the periscope brings the weapons properly to bear on the target. The firing and sighting axes are swept through azimuth by virtue of a rotatable mounting of the operator platform to the support platform, and their elevation is changed by virtue of the pivotable mounting of the operator platform to the support platform.

The foregoing arrangement presents minimal structure for detection by the enemy. Only the periscope, for example, need be visible above the ridge of the concealing terrain. Once the missiles are fired, the periscope and weapons pod can be pivoted to their retracted positions upon the support platform, and the support platform can be lowered quickly to a substantially recessed position with respect to the vehicle chassis. The vehicle propulsion and suspension systems enable rapid movement from the area of possible return fire to another area for renewed missile firings.

The present vehicle is thus an extension of the infantryman's role of launching rockets to resist heavy tank attacks. The vehicle is relatively small, has a high power-to-weight ratio, is relatively inexpensive and is thereby uniquely adapted to be deployed in large numbers.

Other objects and features of the invention will become apparent from consideration of the following description taken in connection with the accompanying drawings.

BRIEF DESCRIPTION OF THE DRAWINGS

FIG. 1 is a side elevational view of a self-propelled off-road vehicle according to the present invention;

FIG. 2 is a plan view of the vehicle of FIG. 1;

FIG. 3 is a front elevational view of the vehicle of FIG. 1;

FIG. 4 is a generally diagrammatic view of the vehicle illustrating the capability of the driving wheels for conventional up and down shock absorbing movement, and also walking beam movement for negotiating rough and steep terrain;

FIG. 5 is a generally diagrammatic illustration of the propulsion and drive train system for the vehicle;

FIG. 6 is a generally schematic view of the compressed air system and the associated air bag suspension elements;

FIG. 12 is a plan view in partial cut-away of an upper section of the operator's platform showing actuating hydraulic cylinders in a retracted position;

FIG. 13 is a plan view in partial cut-away of the upper section of the operator's platform showing the actuating hydraulic cylinder in an extended position;

FIG. 14 is a sectional view of the upper section of the operator's platform taken along the Section Line 14—14 of FIG. 15;

FIG. 15 is a sectional view of the upper section of the operator's platform taken along the Section Line 15—15 of FIG. 14;

FIG. 16 is a sectional view of the operator's platform pivoting mechanism taken along the Section Line 16—16 of FIG. 12; and, FIG. 17 is an elevational view of the elevatable frame mechanism which is displaceable above the platform upper section.

DESCRIPTION OF THE PREFERRED EMBODIMENT

Figure 7:
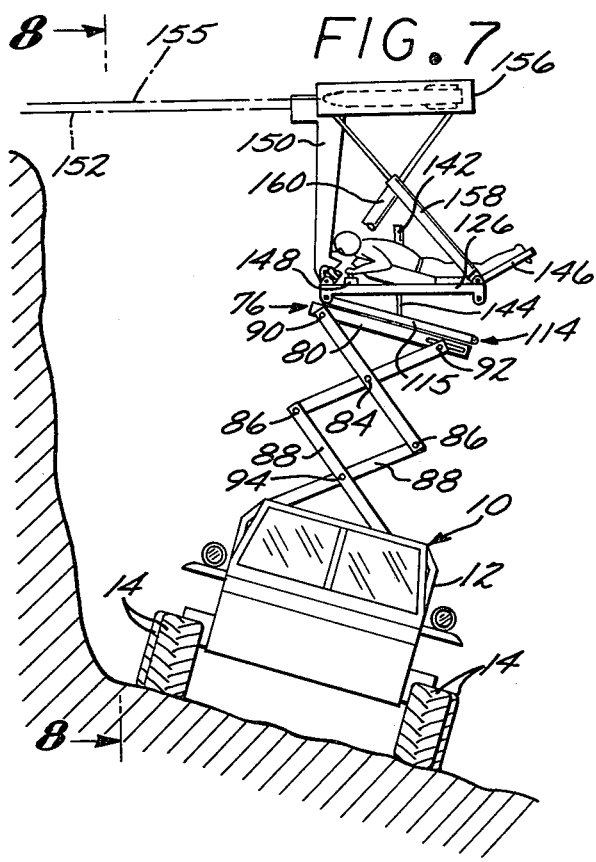
FIG. 7 is a front elevational view of the vehicle of FIG. 1 in a position of concealment, with the support and operator platforms, the periscope, and the weapons pods in their elevated positions.

Referring now to the drawings, and particularly FIGS. 1–6, there is illustrated a self-propelled off-road vehicle 10 according to the present invention which is particularly adapted for military applications, but which may also be utilized as a light duty truck, cargo handler, or observation platform.

The vehicle 10 includes a generally rectangular chassis 12 made of lightweight, high-strength metal tubing suitably welded together and covered with metal plate. The plate sides of the vehicle are generally vertical for simplicity and economy of construction, while the front and rear are preferably sloped to better negotiate sandy or soft terrain. The particular shape and configuration of the vehicle body are only exemplary and the design of the body may be varied, according to the particular application and task specifications.

The vehicle is preferably a two-man vehicle, having space to seat a driver and a platform operator, as seen in FIG. 2. A simple lightweight structure throughout is preferred and, although armor plate and the like could be utilized, speed and maneuverability is relied upon for protection against enemy fire in military applications.

The vehicle 10 is intended to traverse difficult terrain of all kinds and yet be capable of relatively high-speed travel over modern highways. For this purpose, it is provided with eight wheels 14 mounting pneumatic tires having heavy treads for travel over soft ground, sand and the like. As will be seen, the degree of inflation of the tires 14 enables them to travel over the hard surfaces of highways or over yielding surfaces such as sand.

The eight wheels 12 are arranged in four pairs, two pairs on each side of the vehicle. Each pair of wheels 14 is rotatably mounted on a support or walking beam 16. The walking beams 16 in turn are each rotatably mounted on the chassis 12, the beams 16 being freely rotatable to permit the wheels 14 to follow the contour of irregular terrain.

The vehicle 10 is adapted to be leveled to provide as level a firing platform as possible for the weapons system. Illustrated diagrammatically in FIG. 6 are four air suspension springs or bags 18 which, as will be apparent to those skilled in the art, are each connected between the vehicle chassis 12 and the walking beams 16. Inflation of the bags 18 raises the chassis 12 relative to the wheels 14, and deflation lowers the chassis. With this arrangement, selective inflation and deflation of the individual air bags 18 levels the chassis 12 in most situations, such as when the vehicle is located on an inclined surface. The platform supporting the weapons system is also adjustable to properly orient the firing axes of the weapons, as will be seen.

As best seen in FIG. 6, a conventional air compressor 20 carried by the vehicle 10 is suitably engaged with the vehicle engine drive system to provide a reservoir of compressed air in a bank of air cylinders or bottles 22. This air is selectively admitted to certain ones of the air bags 18 by operation of one or more of four control valves 24 located in the vehicle driver's compartment. The valves 24 are also operative to vent air from the associated air bags 18, as will be apparent to those skilled in the art.

In addition to the levelling function provided by the pneumatic system, the system also is adapted to supply compressed air to a pair of inflation systems, generally indicated at 26, located on opposite sides of the vehicle. The systems 26 are suitably connected to the pneumatic tires mounted to the wheels 14 and are operative through control valves 28 to selectively inflate or deflate the tires. When deflated to a low pressure the tires develop maximum traction over loose terrain such as sand. When inflated to a high pressure the tires are capable of high speed travel over highways. The size and number of air bottles 22 are selected to enable reinflation of the tires at least once without operation of the vehicle engine, the number of times of inflation of the tires being unlimited when the engine is running.

Usual air gauges, filters, check valves and the like (not shown) are omitted in the diagrammatic showing of FIG. 6 for brevity, particularly since such components and the advisability of their use are well known to those skilled in the art.

With reference to FIG. 5, the engine 30 is preferably of the Wankle type, and is coupled to an automatic transmission 32 which in turn is coupled to a manual transmission 34 by means of a chain drive 32. Although any of a variety of engine types and combinations, and transmission arrangements, can be utilized in the vehicle 10, the arrangement just described is preferred because it enables a selection of many forward speeds and several reverse speeds. This is an important consideration in negotiating very steep terrain, and also in operating the vehicle at relatively high speeds over modern highways.

The output of the manual transmission 34 is coupled by a chain drive 38 to a forwardly extending drive shaft 40 and a rearwardly extending drive shaft 42. The shafts 40 and 42 are connected to differentials 44 and 46, respectively, the differential 44 driving a pair of transverse forward axles 48 and 50, the differential 46 driving transverse rearward axles 52 and 54. The outer end of each of the axles 48, 50, 52 and 54 is connected to a sprocket 56 which drives a pair of chains 58 operatively connected to rotate the associated wheels 14.

The vehicle 10 is steered by braking the wheels 14 on one side or the other, the brake pads for each wheel 14 being diagrammatically indicated at 62. The hydraulic system for operating the brake pads 62 is diagrammatically indicated by the lines 64 and 66, the lines 66 being connected to a pair of hydraulic cylinders 68 and 70. As diagrammatically indicated, a pair of levers 72 and 74 located in the vehicle driver's compartment are selectively pivotable to operate one or both of the associated cylinders 68 and 70 to brake the wheels 14 on the left side or the right side of the vehicle, or on both sides of the vehicle, depending upon whether the driver wishes to steer the vehicle to the left, to the right, or to slow the vehicle equally on both sides.

Figure 8:
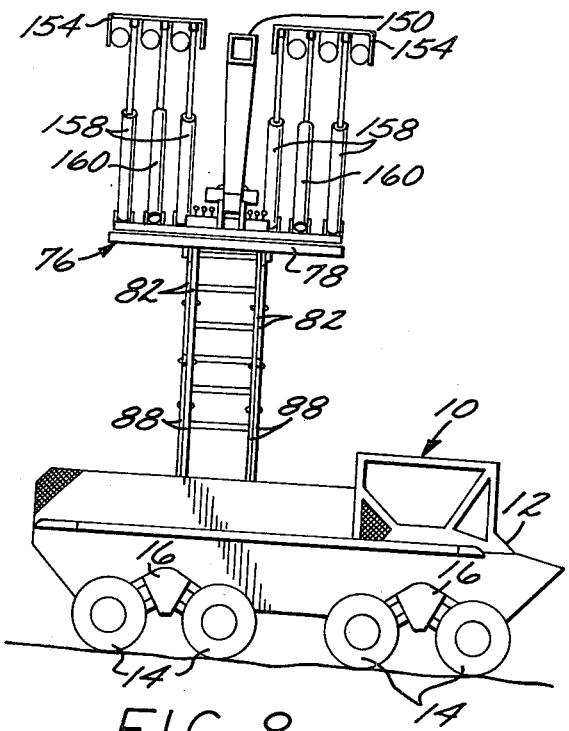
FIG. 8 is a view taken along the line 8—8 of FIG. 7.

With reference to FIGS. 2 and 7–17, and particularly FIGS. 7 and 8, a rectangular support platform 76 is illustrated as having a pair of spaced apart, longitudinally extending side elements 78 connected together by a pair of transverse cross or end members 80. It is adapted to be raised and lowered relative to the vehicle chassis 12 by means of a scissors linkage mechanism. This mechanism comprises two pairs of longitudinally spaced apart upper scissors arms 82 pivotally connected at their midportions by a pair of pivot pins 84. Their lower extremities are pivotally connected by a pair of pivot pins 86 to two similar pairs of lower scissors arms 88.

The upper extremities of the two pairs of upper scissors arms 82 are pivotally connected to the support platform 76 by two pairs of pivot pins 90 and 92, the pins 92 being transversely slidable within suitable transverse slots provided in the cross members 80 of the platform 76 to enable relative movement between the pins 42 and the platform 76 during raising and lowering of the platform 76.

The pairs of lower scissors arms 88 are pivotally connected at their midportions by a pair of pivot pins 94, and their lower extremities are pivotally connected by two pairs of pivot pins 96 to the side members (not shown) of a rectangular frame 98. One of the cross or end members 100 of the frame 98 is seen in FIG. 12. The end and side members of the frame 98 are rigidly secured in any suitable fashion to the vehicle chassis 12.

As best seen in FIGS. 12 and 13, the pair of pivot pins 86 on one side of the platform 76 are pivotally connected to the lower extremities of a pair of arms constituting the lower portions of a yoke 102 of inverted U-shaped configuration, as best seen in FIGS. 12 and 13. The other pair of pins 86 are similarly connected to a second yoke 102 (not shown). For each yoke 102 there are provided three hydraulic cylinders 104 and 110. The two cylinders 104 are secured to one of the end members 100 of the frame 98. The piston rods 106 of these cylinders 104 are fixed to a transverse plate 108, FIG. 13. The third hydraulic cylinder 110 is secured to the underside of the plate 108 and its piston rod 112 is freely movable upwardly and downwardly through an opening (not shown) in the plate 108. The upper end of the piston rod 112 is connected to the upper portion of the associated yoke 102.

As previously indicated, this same arrangement of cylinders 104 and 110 is provided on the other end of the fixed frame 98. Thus, actuation of the four cylinders 104 is operative to raise the plate 108 and the associated pair of yokes 102, the depending arms of the yokes 102 raise the pivot pins 96 and thereby upwardly pivot the scissor arms 82 and 88 of the scissor linkage mechanism.

Concurrent actuation of the pair of cylinders 110 additionally raises the pair of yokes 102 a distance equal to the upward travel of the piston rods 112. The change in position of the components from their lowered positions to their raised positions is illustrated in FIGS. 12 and 13.

Raising of the yokes 102 and the associated pins 86 upwardly extends the scissors arms 82 and 88, raising the support platform 76 to the position illustrated in FIGS. 7-10.

As best seen in FIGS. 14 and 15, a generally rectangular operator platform 114 having approximately the same perimetrical dimensions as the support platform 76 is located superjacent the platform 76. It includes end members 115 and side members 117. The platform 114 is rotatable about a generally vertical axis, and also is selectively pivotable about a pair of longitudinal axes, as will be seen.

Rotatable mounting of the operator platform 114 takes place about a pin 116 which is suitably welded or otherwise fixed to the mid portion of the support platform 76. The upper end of the pin 116 is rotatably disposed through a suitable bushing (not shown) forming a part of the operator platform 114. The upper end of the pin 116 is rigidly secured to a sprocket 118 about which is trained a chain 120.

The ends of the chain 120 are connected to the piston rods of a pair of double acting pistons 122 and 124 which are secured to one of the end members 115 of the operator platform 114. Movement of the piston rods of the cylinders 122 and 124 in opposite directions effects rotation of the platform 114 relative to the platform 76, the direction of rotation depending upon the actuation of the cylinders, as will be apparent.

The operator platform 114 includes a rectangular upper section 126 which is selectively pivotable about either the longitudinal axis 128 or the longitudinal axis 130, as seen in FIG. 14.

The section 126 includes a pair of side members 134 and 137 and a pair of end members 139. These normally overlie the side members 117 and end members 115 of the lower or parent portion of the operator platform 114.

A pair of longitudinally spaced apart tabs 132 project laterally and downwardly from each of the forward and rearward extremities of the side member 134. Similar tabs 136 project from each of the forward and rearward extremities of the side member 137.

The tabs 132 and 136 mate with tabs on the side members 117, all including longitudinally aligned openings (not shown) adapted to receive the ends of associated piston rods forming a part of four hydraulic cylinders 138 mounted to the side members 117 adjacent the four corners of the platform 114.

The upper section 126 is pivotable about the axis 128 by first actuating the cylinders 138 to project their piston rods into the openings in the tabs 132 to thereby define hinge points. Simultaneously, the opposite cylinders 140 are operated to retract their piston rods from the associated tabs 136. This enables the upper section 126 to pivot to the position illustrated in FIG. 9. Conversely, if the cylinders 138 are operated to retract their piston rods from the associated tabs 132, and the cylinders 140 are operated to project their piston rods through the openings in the tabs 136, the upper section 126 can be pivoted about the axis 130 to the position illustrated in FIG. 10.

Figure 9:
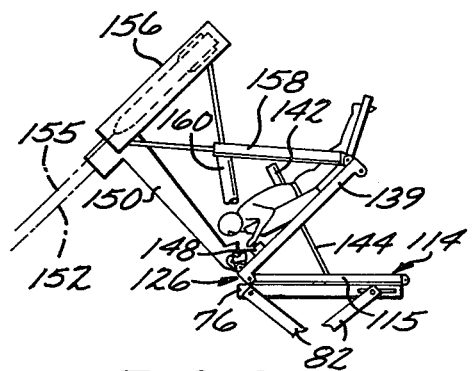
FIG. 9 is a view similar to FIG. 7, but primarily illustrating the operator platform as it would appear when the sighting axis of the periscope and the firing axes of the weapons pods are directed downwardly.
Figure 10:
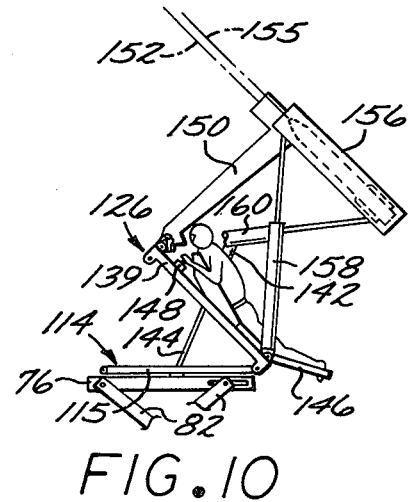
FIG. 10 is a view similar to FIG. 9, but illustrating the attitude of the operator platform with the sighting axis of the periscope and the firing axes of the weapons pods directed upwardly.

As best seen in FIGS. 12, 16, and FIGS. 9 and 10, the upper section 126 is pivoted by actuation of a pair of hydraulic cylinders 142 pivotally secured to the mid portions of the end members 139, respectively. Only one of the cylinders 142 is seen in FIGS. 9 and 10. The piston rods 144 of the cylinders 142 project downwardly and are pivotally connected to the mid portions of the end members 115 of the operator platform 114.

A transversely oriented operator's couch 146 is secured to the middle of the upper section 126 of the operator's platform 114. The leg end of the couch projects laterally of the upper section 26 in use and, preferably, when not in use is inwardly pivotable to overlie the section 126.

Figure 11:
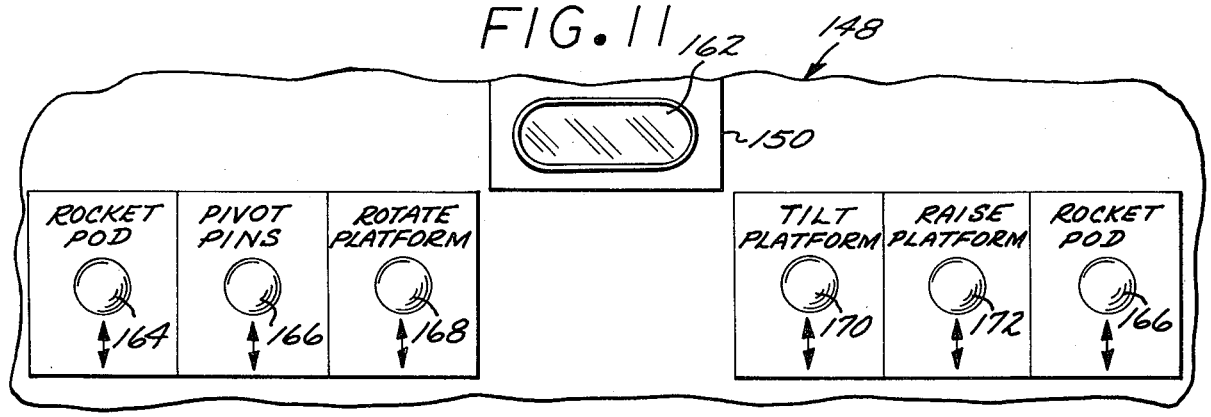
FIG. 11 is a generally diagrammatic showing of the control console operative by the operator to effect various movements of the vehicle components.

As best seen in FIG. 11, a suitable operator's console 148 is attached to the upper section 126 in front of the operator. The viewing window 162 of an elongated sighting device such as a periscope 150 is also located in front of the operator. The periscope 150 is mounted at its lower extremity to the upper section 126 for pivotal movement from a retracted position overlying and generally parallel to the upper section 126 to the projected or elevated position illustrated in FIGS. 9 and 10.

Such pivotal movement is effected by actuation of a double acting hydraulic cylinder 151 which is mounted to the upper section 126, and whose piston rod is pivotally connected to a suitable bracket 153 carried by the periscope 150, as indicated in FIG. 12. Details of the periscope 150 are omitted for brevity since it may be any optical device operative to enable the operator to view a target located along the periscope sighting axis generally indicated at 152 in FIGS. 9 and 10.

A pair of weapons pods 156 are also mounted on the upper section 126, being located on either side of the operator couch 146. The term "pod" is used to designate any weapons system, such as missiles or the like, suitable to satisfy the military requirements of the mission. As will be seen, the pods are secured to a pair of frames 154 which are elevatable above the platform upper section 126 to bring the firing axes 155 of the pods 156 into predetermined relationship with the sighting axis 152 of the elevated periscope 150.

As best seen in FIG. 17, each frame 154 is rectangular and includes mounting brackets and the like (not shown) to which the pods 156 can be attached. For clarity the pods 156 are omitted in FIG. 17. Each of the two frames 154 can be raised and lowered by operation of a set of three hydraulic cylinders 158, one set for each frame. The middle cylinder 158 is pivotally connected at its lower extremity to side member 134 of the upper section 126, while the piston rod 160 thereof is pivotally mounted to one side of the pod frame 154.

The lower ends of the other pair of cylinders 158 are secured on either side of the middle cylinder 158 to side member 137 of the upper section 126, the piston rods 160 thereof being pivotally connected to the opposite side of the pod frame 154. Actuation of all of the cylinders 158 to extend their piston rods 160 raises both sides of the missile frame 154 in parallelogram fashion relative to the upper section 126. Likewise, actuation of the cylinders 158 in the opposite direction causes the missile frames 154 to descend to their retracted positions.

The controls on the console 148 are shown diagrammatically in FIG. 11, the circles designating handles movable in opposite directions to actuate the associated double acting hydraulic cylinders. Although not shown, these cylinders are part of a conventional hydraulic system (not shown) which includes the usual valves, filters, reservoirs, and hydraulic motors suitable to accomplish the functions described, as will be apparent to those skilled in the art.

The control 164 is operative to actuate the left set of cylinders 158 to raise and lower the left weapons pod 156, while the control 166 is operative to actuate the right set of cylinders 158 to raise and lower the right weapons pod 156.

The control 166 is operative in one direction to project the piston rods of the cylinders 138 and retract the rods of the cylinders 140, and is operative in the opposite direction to retract the rods of the cylinders 138 and project the rods of the cylinders 140, thereby readying the upper section 126 for pivotal movement about the axes 128 and 130, respectively.

The foregoing actuation of the control 164 is normally immediately followed by actuation of the control 172 to actuate the double acting cylinders 142 to either project or retract their piston rods 144 for raising or lowering the upper section 126, which sweeps the viewing axis 152 and firing axes 155 through the elevation mode.

Control 168 is operative in opposite directions to actuate one or the other of the cylinders 122 and 124 to rotate the operator platform 114 about the axis of the pin 116, which sweeps the viewing axis 152 and firing axes 155 through the azimuth mode.

Control 172 is operated in opposite directions to actuate the double acting hydraulic cylinders 104 and 110 to raise or lower the operator platform 76 relative to the frame 98 attached to the vehicle chassis 12.

As a consequence of the vehicle construction and operation just described, the vehicle 10 can be quickly deployed across highways and rugged terrain to a position of concealment near a target area. Assuming the concealment is provided by a low hill or the like, the vehicle pneumatic system is selectively operated to inflate and deflate such of the air bags 18 as will generally level the vehicle chassis 12, particularly along a fore and aft axis. This operation of selective inflation and deflation can be done in approximately one to two seconds. This will orient the firing axes 155 in a generally horizontal plane.

The support platform 76 is then raised to place the operator platform 114 just below the crest of the hill. The periscope 150 and weapons pods 156 are next elevated to positions just above the crest of the hill. The extension of the platforms, periscope and pods is envisioned as being very rapid, in the order of less than two seconds. The operator then effects rotation and tilting of the upper section 126 in the proper directions to bring the target into coincidence with the sighting axis 152. Although not illustrated, usual fire control and range determination apparatus is employed to establish the distance from the target and also automatically locate the firing axes 155 in predetermined relation to the sighting axis 152 so that the fired missiles will be on target.

The vehicle 10 has been described primarily in connection with its capability for seeking out and destroying enemy tanks. However, the unique self-leveling capability of the vehicle, and the ability to orient the operator platform on various attitudes and at different heights, also suits the vehicle for use in photo reconnaissance missions, in any maintenance tasks requiring access to elevated structures, and in related missions. For example, a camera (not shown) can be mounted on the operator platform for use with its own viewing system, or the camera would be arranged to take photographs through the periscope or other optical system. If desired, the camera could be mounted on one of the weapons pods and remotely controlled by the operator.

Similarly, should it be important to raise a person to a vantage point on an elevated ledge, or to tap into wires at the top of telephone poles, the operator platform need only be raised, rotated, and pivoted, as required. Various other uses will suggest themselves to those skilled in the art, and the invention is not to be limited in its applications merely to those applications mentioned. All structures coming within the scope of the appended claims are comprehended within the scope of the invention.

The present vehicle utilizes many components which are readily available and easily assembled by conventional fabrication techniques. Consequently, the cost of the vehicle is a fraction of the sophisticated anti-tank vehicles presently in use. The light weight, easy mobility, and capability for negotiating rough terrain, uniquely suit the present vehicle to the specialized military tasks of quickly seeking out enemy tanks, launching weapons from concealed positions, quickly moving on to escape return fire, and launching renewed attacks from other firing positions.

Various modifications and changes may be made with regard to the foregoing detailed description without departing from the spirit of the invention.

I claim:

1. A self-propelled off-road vehicle comprising:
a chassis;
platform means including a support platform and an operator platform adapted to support an operator;
first means operative to raise said platform means relative to said chassis;
sighting means carried by said operator platform and characterized by a sighting axis;
second means operative to raise said sighting means relative to said operator platform;
a weapons pod carried by said operator platform and characterized by a firing axis;
third means operative to raise said weapons pod relative to said operator platform to orient said firing axis in predetermined relation to said sighting axis; and
fourth means operative to rotate said operator platform relative to said chassis to direct said sighting axis toward a target area.

2. A self-propelled off-road vehicle according to claim 1 wherein said first means includes a pair of extendable scissor linkage means connected at opposite extremities to said platform means and said chassis, respectively.

3. A self-propelled off-road vehicle according to claim 1 wherein said sighting means are carried by said operator platform for pivotal movement by said second means between a lowered position and a raised position, said sighting axis and said firing axis being oriented in said predetermined relation in said raised position.

4. A self-propelled off-road vehicle according to claim 3 wherein said operator platform is carried by said support platform for pivotal movement relative to said support platform to cause said sighting axis of said sighting means in said raised position to sweep through a generally vertical arc.

5. A self-propelled off-road vehicle according to claim 1 wherein said operator platform includes upper and lower sections each characterized by oppositely located first and second extremities, said vehicle further including:
first pivot means associated with said first extremities and interconnectable to enable said upper section of said operator platform to pivot upwardly about a first axis defined by said first pivot means thereby to sweep said sighting axis downwardly;
second pivot means associated with said second extremities and interconnectable to enable said upper section of said operator platform to pivot upwardly about a second axis defined by said second pivot means thereby to sweep said sighting axis upwardly;
hinge means operative in a first state to interconnect said first pivot means and disconnect said second pivot means, and operative in a second state to interconnect said second pivot means and disconnect said first pivot means; and
means operative to urge said upper section of said operator platform upwardly relative to said lower section of said operator platform to pivot said upper section of said operator platform about one of said first and second axes.

6. A self-propelled off-road vehicle according to claim 1 and including pneumatic tires; and means for adjustably inflating and deflating said tires whereby the traction of said tires with the tire engaging surface is adjustable.

7. A self-propelled off-road vehicle according to claim 1 wherein said chassis includes a plurality of axles; a plurality of walking beam suspension means carried at the opposite extremities of said axles; and a plurality of pairs of wheels mounted to said walking beam suspension means, respectively.

8. A self-propelled off-road vehicle according to claim 1 and including pneumatic tires; compressed air storage means; an air compressor operative to charge said storage means; and air inflation means coupled to said tires for adjustably inflating and deflating said tires whereby the traction of said tires with the tire engaging surface is adjustable.

9. A self-propelled off-road vehicle according to claim 1 and including a plurality of supporting wheels; a plurality of air bag suspension means connected between said chassis and said wheels, respectively; and means for inflating and deflating said suspension means for raising and lowering, respectively, said chassis relative to said wheels.

10. A self-propelled off-road vehicle according to claim 1 and including a plurality of supporting wheels; an engine; automatic transmission means coupled to said engine; manual transmission means coupled to said automatic transmission means; and drive axle and differential means coupling said manual transmission means to said wheels.

11. A self-propelled off-road vehicle comprising:
a chassis;
a support platform;
first means operative to raise said support platform above said chassis;
an operator platform located superjacent said support platform, and including a lower section and further including an upper section adapted to support an operator, said upper section having a retracted position overlying said lower section in generally parallel relation to said support platform;
elongated optical sighting means pivotally connected at one extremity to said upper section, and characterized by a viewing port at said one extremity and by a sighting axis defined at its opposite extremity;
second means operative to pivot said one extremity of said optical sighting means from a retracted position adjacent said upper section of said operator platform to a raised position above said upper section;
third means operative to rotate said lower section about a generally vertical axis to direct said sighting axis of said sighting means in said raised position toward a target area;
a weapons pod carried by said upper section of said operator platform and characterized by a firing axis;
fourth means operative to raise said weapons pod above said upper section of said operator platform to orient said firing axis in predetermined relation to said sighting axis of said sighting means in said raised position of said sighting means; and
fifth means operative to tilt said upper section of said operator platform from said retracted position for directing said sighting axis toward said target area.

12. A self-propelled off-road vehicle according to claim 11 wherein said sighting means comprises a periscope.

13. A self-propelled off-road vehicle according to claim 11 wherein said third means comprises a pair of fluid actuated cylinders mounted to said lower section;

a sprocket secured to said support section; and an elongated chain extending around said sprocket and connected at its opposite extremities to said pair of cylinders, respectively, whereby actuation of said pair of cylinders in opposite directions effects rotation of said lower section relative to said support platform.

14. A self-propelled off-road vehicle according to claim 11 wherein said first means comprises a plurality of scissors linkage arms connected between said chassis and said support platform on opposite sides of said support platform; a pair of transversely spaced apart yokes located on opposite sides of said support platform and connected to said linkage arms; and fluid actuated means connected between said chassis and said pair of yokes, said fluid actuated means being operative to raise said pair of yokes whereby said linkage arms are raised for elevating said support platform.

15. A self-propelled off-road vehicle according to claim 11 wherein said fifth means comprises first pivot means associated with adjacent first extremities of the superjacent upper and lower sections of said operator platform; second pivot means associated with adjacent second extremities of said upper and lower sections opposite said first extremities; hinge means operative in a first state to interconnect said first pivot means and disconnect said second pivot means, and operative in a second state to interconnect said second pivot means and disconnect said first pivot means; and fluid actuated means operative to raise said upper section relative to said lower section whereby said upper section pivots about said first pivot means in said first state of said hinge means, and about said second pivot means in said second state of said hinge means.

16. A self-propelled off-road vehicle comprising:
a chassis;
a support platform;
first means operative to raise said support platform above said chassis;
an operator platform located superjacent said support platform, and including a lower section and further including an upper section adapted to support an operator said upper section having a retracted position overlying said lower section in generally parallel relation to said support platform;
sighting means mounted to said operator platform upper section and characterized by a sighting axis, said sighting means being movable relative to said operator platform to direct said sighting axis toward a target area;
second means operative to rotate said lower section about a generally vertical axis; and,
third means operative to tilt said upper section of said operator platform from said retracted position, said sighting means being pivotally secured to said upper section of said operator platform for pivotal displacement from a substantially retracted position generally parallel with respect to said upper section to an elevated position.

17. A self-propelled off-road vehicle comprising:
a chassis;
a support platform;
first means operative to raise said support platform above said chassis;
an operator platform located superjacent said support platform, and including a lower section and further including an upper section adapted to support an operator, said upper section having a retracted position overlying said lower section in generally parallel relation to said support platform;
second means operative to rotate said lower section about a generally vertical axis; and
third means operative to tilt said upper section of said operator platform from said retracted position and comprising first pivot means associated with adjacent first extremities of the superjacent upper and lower sections of said operator platform; second pivot means associated with adjacent second extremities of said upper and lower sections opposite said first extremities; hinge means operative in a first state to interconnect said first pivot means and disconnect said second pivot means, and operative in a second state to interconnect said second pivot means and disconnect said first pivot means; and fluid actuated means operative to raise said upper section relative to said lower section whereby said upper section pivots about said first pivot means in said first state of said hinge means, and about said second pivot means in said second state of said hinge means.

* * * * *